(12) United States Patent
Royston et al.

(10) Patent No.: US 9,413,430 B2
(45) Date of Patent: *Aug. 9, 2016

(54) MEASUREMENT AND REPORTING OF RECEIVED SIGNAL STRENGTH IN NFC ENABLED DEVICES

(71) Applicant: Broadcom Corporation, Irvine, CA (US)

(72) Inventors: Philip Stewart Royston, Newbury (GB); David Grant Cox, Newbury (GB)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,816

(22) Filed: Apr. 16, 2015

(65) Prior Publication Data

US 2015/0229362 A1   Aug. 13, 2015

Related U.S. Application Data

(63) Continuation of application No. 13/169,609, filed on Jun. 27, 2011, now Pat. No. 9,042,814.

(51) Int. Cl.
| | |
|---|---|
| *H04B 5/00* | (2006.01) |
| *H04W 4/00* | (2009.01) |
| *H04W 4/02* | (2009.01) |
| *H04B 17/318* | (2015.01) |

(52) U.S. Cl.
CPC ............ *H04B 5/0043* (2013.01); *H04B 5/0062* (2013.01); *H04B 17/318* (2015.01); *H04W 4/008* (2013.01); *H04W 4/023* (2013.01)

(58) Field of Classification Search
CPC . H04B 5/0062; H04B 17/0057; H04W 4/023; H04W 4/008

USPC ............... 455/41.1, 41.2, 41.3, 67.11, 67.14, 455/67.16, 67.7
See application file for complete search history.

(56) References Cited

U.S. PATENT DOCUMENTS

| | | | |
|---|---|---|---|
| 7,127,214 B2* | 10/2006 | Goldberg | H04B 17/309 455/115.1 |
| 7,986,916 B2 | 7/2011 | Williams | |
| 8,180,285 B2* | 5/2012 | Rofougaran | H01Q 1/2225 375/295 |
| 2001/0041539 A1 | 11/2001 | Juntunen et al. | |
| 2002/0094782 A1* | 7/2002 | Lin | H04W 52/343 455/67.11 |

(Continued)

*Primary Examiner* — Ping Hsieh
(74) *Attorney, Agent, or Firm* — Sterne, Kessler, Goldstein & Fox P.L.L.C.

(57) ABSTRACT

An NFC-enabled device including tag emulation circuitry and reader emulation circuitry operates so as to provide a signal strength meter function. The signal strength meter function, in tag emulation mode, measures and reports on how well the tag is coupled to a third party reader field. In reader emulation mode, the signal strength meter function measures and reports how well the reader of the NFC-enabled device couples to a tag that is being read. One exemplary method includes detecting an NFC reader field, operating reader receiver circuitry at the NFC-enabled device so as to at least determine the strength of a signal received from the reader field, generating information representative of the determined strength of the signal received from the reader field at a first time, and performing one or more predetermined actions based at least in part on the one or more signals representative of the determined strength. Predetermined actions may include generating visual, audio, and/or other indications of the received signal strength.

19 Claims, 6 Drawing Sheets

(56) References Cited

U.S. PATENT DOCUMENTS

| | | | |
|---|---|---|---|
| 2002/0119756 A1* | 8/2002 | Arai | H04M 1/72502 455/67.7 |
| 2007/0026826 A1* | 2/2007 | Wilson | G06K 19/0723 455/130 |
| 2007/0287399 A1* | 12/2007 | Lee | H04B 17/318 455/226.2 |
| 2009/0011706 A1* | 1/2009 | Wilson | H04B 5/02 455/41.1 |
| 2010/0190436 A1* | 7/2010 | Cook | H04B 5/00 455/41.1 |
| 2010/0291871 A1* | 11/2010 | Butler | G06K 19/0701 455/41.1 |
| 2010/0323629 A1* | 12/2010 | Wuidart | G06K 19/0701 455/67.11 |
| 2012/0329389 A1 | 12/2012 | Royston et al. | |

* cited by examiner

MEASUREMENT AND REPORTING OF RECEIVED SIGNAL STRENGTH IN NFC ENABLED DEVICES

CROSS-REFERENCE TO RELATED APPLICATIONS

This application is a continuation of U.S. patent application Ser. No. 13/169,609, filed 27 Jun. 2011, and entitled "Measurement And Reporting Of Received Signal Strength In NFC-Enabled Devices," the entirety of which is hereby incorporated.

FIELD OF THE INVENTION

The present invention relates generally to Near Field Communication (NFC) devices and the operation and application thereof. More particularly, the present invention relates to methods and apparatus for measuring and reporting the strength of an NFC reader field.

BACKGROUND

Advances in semiconductor manufacturing technologies have resulted in dramatically increased circuit packing densities and higher speeds of operation. In turn, these advances have provided designers with the ability to produce many processor and communication functions that were not previously practical. In some instances these functions are combined in a single highly integrated device. In other instances these functions are partitioned into two or more devices or chips.

Advances in digital systems architecture, in combination with the advances in the speed and density of semiconductors, have resulted in the availability of substantial computing power and digital communications networks for relatively low cost. In turn, this has led to a vast installed base of computers and other computational platforms each with the ability to communicate with others.

Given the very large installed base of computational platforms, which includes at least personal computers and smartphones, it is not surprising that new operational paradigms for computational devices have been developed. It is noted that early computational platforms and communication networks served the military/industrial/commercial application space, whereas the vast increases in computational and communication capacities and concurrent cost reductions have resulted in today's ubiquitous platforms and networks serving the personal application space. Indeed, personal applications have gone beyond the deskbound model of interacting with a computer to a model wherein computing and communication hardware are truly personal items, are highly mobile, and are integrated into the fabric of modern living. Consistent with this usage model for powerful personal computational and communication devices, many applications of "on-the-go" computing and communication have been, and are being, developed. One class of such on-the-go applications involves Near Field Communication (NFC) between devices. Applications such as conducting financial transactions with stores, banks, trains, busses, and so on may be facilitated by the near-field coupling of two devices to exchange financial and/or personal information.

It will be appreciated that communications involving financial and/or personal information should be performed with a high degree of reliability. High reliability near-field communication is served by optimally placing the NFC antenna of an NFC reader receiver within the near-field region of a NFC tag.

What is needed are methods, apparatuses and systems for measuring the received signal strength in a near-field communication, and reporting on the strength of the received signal, or otherwise providing guidance in connection with improving and maintaining a reliable communications connection.

BRIEF DESCRIPTION OF THE DRAWINGS

Embodiments of the invention are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
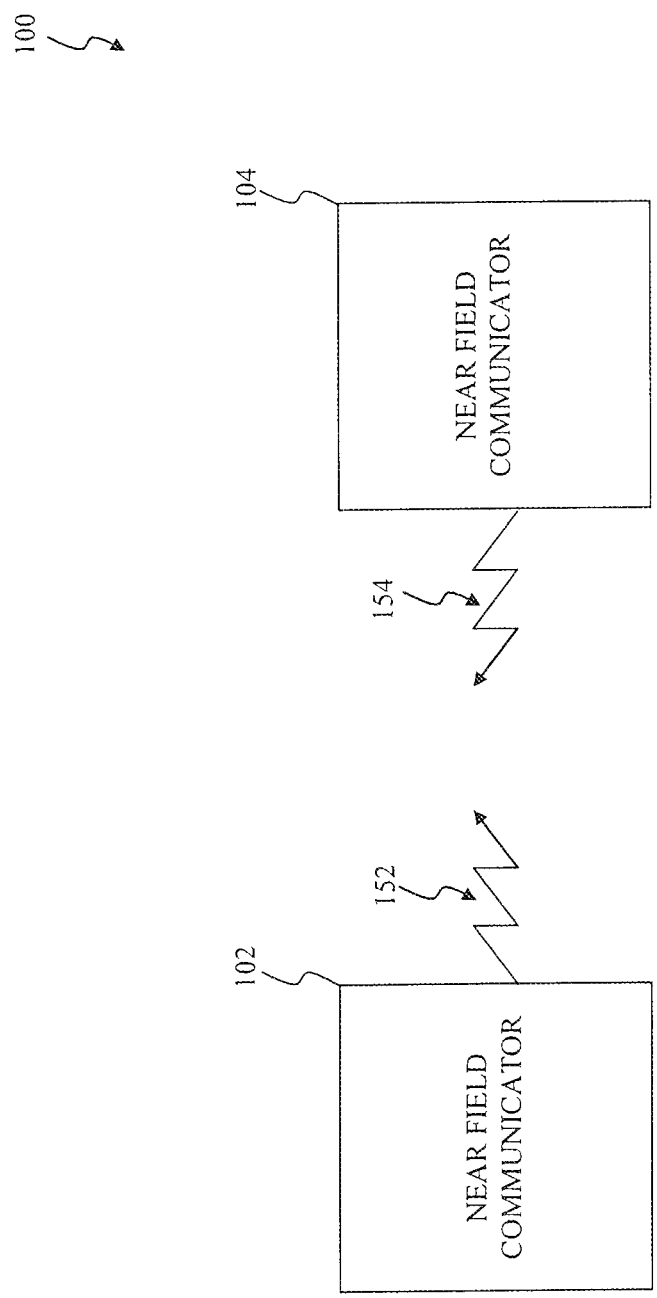
FIG. 1 is a block diagram illustrating a near field communication (NFC) environment in accordance with the present invention.

Generally, when a pair of NFC-enabled devices, such as a tag and a reader, are within a near-field coupling distance of each other, a current is induced in the tag's antenna when the reader is active. Alternatively, when another pair of NFC-enabled devices, such as a reader and a communicator, are within the near-field coupling distance of each other, a current change is induced in the reader's antenna when the communicator is providing a response to the reader. The reader is the source of the current and the tag causes the current to change. Typically, a communicator is a NFC-enabled device that may be configured to operate a reader of a tag and has the capability of switching between operation as the reader or the tag. It should be noted that the reader may be implemented as another communicator. In typical embodiments of the present invention, NFC-enabled devices use the induced antenna current, which represents the incoming information signal from the reader, to produce a signal that is provided to receiver circuitry within the reader to produce in-phase (I) and quadrature (Q) signals used in processing the incoming information signal. In accordance with the present invention, the signal strength meter circuitry uses amplitudes of the I and Q signals to provide a measure of the signal strength received from a reader field, and based at least in part on this measure of the received signal strength, a report of the strength of the near-field coupling between the tag and the reader or between the communicator and the reader is provided. It is noted that, in both the tag and reader cases, the signal strength is normally derived from a combination of the I and Q signal amplitudes ($I^2+Q^2$) to get the vector amplitude of the signal.

Various methods and apparatus for reporting the received signal strength resulting from the near-field coupling are disclosed herein.

In alternative embodiments, an NFC-enabled device operating in reader emulation mode uses its reader receiver to determine how well it is coupling to another NFC-enabled device, such as a tag that is to be read.

The following Detailed Description refers to accompanying drawings to illustrate exemplary embodiments consistent with the invention. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

Terminology

As used herein, the expression "Near-field communicator" refers to a product that includes at least the resources to provide NFC tag and NFC tag reader functionality. Such products may be sometimes referred to as NFC-enabled devices.

Operating system refers generally to the software that schedules tasks, allocates storage, handles the interface to peripheral hardware and presents a default interface to the user when no application program is running.

As used herein, the term "transponder" refers to circuitry including a transmitter and a receiver such that a transponder may be used to transmit information responsive to receiving a query or other form of interrogation signal or communication. It is noted that a transponder may be implemented without any requirement of integration on a single die, and the present invention is not limited to any particular partitioning of transponder functionality amongst any particular number of components. In typical embodiments, transponders are formed on a single die.

The terms, chip, die, integrated circuit, semiconductor device, and microelectronic device, are often used interchangeably in the field of electronics. The present invention is applicable to all the above as these terms are generally understood in the field.

With respect to chips, it is common that power, ground, and various signals may be coupled between them and other circuit elements via physical, electrically conductive connections. Such a point of connection may be referred to as an input, output, input/output (I/O), terminal, line, pin, pad, port, interface, or similar variants and combinations. Although connections between and amongst chips are commonly made by way of electrical conductors, those skilled in the art will appreciate that chips and other circuit elements may alternatively be coupled by way of optical, mechanical, magnetic, electrostatic, and electromagnetic interfaces.

The term "smartcard" refers to a physical substrate, such as a credit card sized piece of plastic, having an integrated circuit embedded therein. Typically, smartcards are used for financial transactions or secure access to locked facilities. An active smartcard is one that includes an embedded power supply such as a battery. A passive smartcard is one that requires power to be supplied from an external source. In some instances, the external source is an energization field from which the passive smartcard harvests the energy needed to carry out its desired function.

An Illustrative Near Field Communications Environment

FIG. 1 is a block diagram showing an NFC environment in accordance with the present invention. An NFC environment 100 provides wireless communication of information among a first NFC device 102 and a second NFC device 104 that are sufficiently proximate to each other. The information may include one or more commands to be executed by first NFC device 102 and/or second NFC device 104, data from one or more data storage devices that is to be transferred to first NFC device 102 and/or second NFC device 104, or any combination thereof. The data storage devices may include one or more contactless transponders, one or more contactless tags, one or more contactless smartcards, any other machine-readable media that will be apparent to those skilled in the relevant art(s) without departing from the spirit and scope of the invention, or any combination thereof. Other machine-readable media may include non-transitory storage media, such as but not limited to, volatile memory, e.g., random access memory (RAM); non-volatile memory, e.g., read only memory (ROM), flash memory, magnetic disk storage media, and optical storage media. Still other machine readable media may include electrical, optical, acoustical or other forms of propagated signals such as carrier waves, infrared signals, and digital signals, to provide some examples.

As mentioned above, improvements in manufacturing technologies and digital architecture have resulted in a number of products and product categories that were not previously possible or practical to implement. The emerging developments in the area of Near Field Communication (NFC)

circuits, systems and applications is making new products and product categories possible. Products incorporating Near-Field Communication capabilities are sometimes referred to as NFC-enabled. For example, mobile phones, smart cards, key fobs, secure access cards, tablet computers, or other electronic products that include NFC capabilities are referred to as NFC-enabled. Near-field communication allows data to be communicated from a first NFC-enabled device to a second NFC-enabled device over short distances. Although a strict definition for the range of short distances is not agreed upon in the field, short range for NFC usually is thought of as being less than 4 cm, or within one wavelength of the selected communication frequency, typically 13.56 MHz.

NFC Device Signal Strength Measurement and Reporting

Typical NFC arrangements involve a pair of devices in which a first device acts as a target or "tag" to respond to a communication and a second device within a near-field coupling distance of the first device acts as a "reader" to initiate the communication. In various embodiments of the present invention the first device may be equipped with the circuitry for acting as both a tag and a reader, commonly referred to as a communicator. Electronic products that include NFC tag circuitry along with circuitry for other functionality may be referred to as tag emulators, or to have the capability of operating in "tag emulation mode". Similarly, electronic products that include NFC reader circuitry along with circuitry for other functionality may be referred to as reader emulators, or to have the capability of operating in "reader emulation mode".

As will be described in greater detail below, NFC-enabled devices and applications have utility in at least consumer electronics and industrial products.

In connection with the following illustrative embodiments, it is noted that any reference to a computational platform is intended to include similar computational devices and computers regardless of their form factor or input/output configuration. By way of example, and not limiting, a smartphone is a computational platform.

Methods and apparatus in accordance with the present invention provide for NFC-enabled devices that determine the signal strength received from an NFC reader's field, and to take one or more actions based on that measured signal strength. More particularly, in illustrative embodiments wherein the NFC-enabled device is operating in tag emulation mode, in-phase (I) and quadrature (Q) components of the received signal in the demodulator of the reader receiver are measured, and one or more outputs are generated, based at least in part on the measured I and Q. These one or more outputs are typically designed to be user perceivable. User perceivable outputs can inform a user of the strength of the incoming signal. In some embodiments, the user perceivable outputs can direct a user regarding how to spatially orient the NFC-enabled device to improve the received signal strength.

Figure 2:
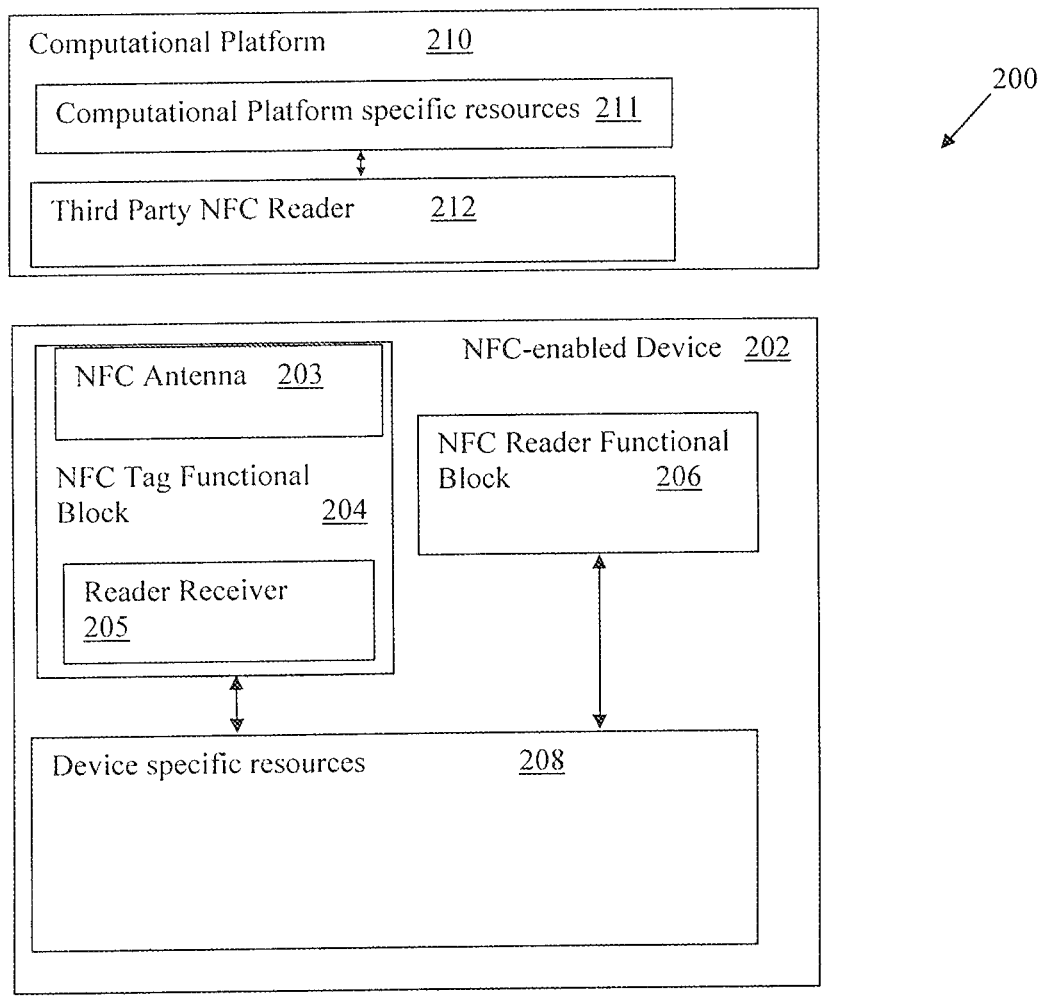
FIG. 2 is a high-level block diagram illustrating an NFC-enabled device having both tag and reader functionality, the NFC-enabled device disposed adjacent a computational platform having NFC tag reader functionality.

FIG. 2 shows a high-level block diagram of a near-field communication arrangement 200 that includes a NFC-enabled device 202 having both tag 204 and reader 206 functional blocks, the NFC-enabled device 202 being disposed adjacent to a second NFC-enable device such as a computational platform 210 having NFC tag reader 212 functionality. The circuitry block that implements NFC Tag 204 includes an NFC antenna 203 and a reader receiver 205. NFC-enabled device 202 further includes device specific resources 208. In typical embodiments, device specific resources 208 are coupled to both the NFC Tag 204 and the NFC reader 206.

Since almost any electronic product may be provided with NFC capabilities, NFC-enabled devices may include, but are not limited to, computational platforms, smart cards, smart phones, mobile phones, secure access cards, bus and train payment cards, key fobs, utility meters, sensors, and so on. Device specific resources 208 may include a wide variety of hardware, and may further include software (i.e., stored program code). Stored program code, when executed, may implement an operating system and/or application programs for the NFC-enabled device 202. Stored program code is typically stored in memory devices disposed within NFC-enabled device 202. Such memory devices may be implemented with any suitable type of memory circuitry. Those skilled in the art will recognize that memory may be implemented as addressable regions within a single memory chip, or addressable regions of several different memory chips. In typical embodiments, at least a portion of the memory includes non-volatile memories. Non-volatile memories have the characteristic of retaining the contents stored therein even when no power is applied to those memories. There are a number of types of non-volatile memory including, but not limited to, flash memory, Read Only Memory (ROM), one-time programmable memory, fuse programmable memory, anti-fuse programmable memory, laser programmable memory, electrically alterable read only memory, and so on. In typical embodiments, at least a portion of the memory in the NFC-enabled device is a non-volatile memory that can be repeatedly written to, as well as read from.

In some embodiments, device specific resources 208 include one or more programmable configuration registers. By way of example, and not limitation, if NFC-enabled device 202 is a smart phone, then device specific resources 208 may include, among other resources, one or more cellular telephone radios, a Bluetooth radio, a GPS radio, a Wi-Fi radio, a microprocessor, a graphics processor, volatile and non-volatile memory, stored program code, one or more accelerometers, one or more digital cameras, a display screen, a display screen controller, audio inputs and outputs, and so on. In typical embodiments NFC Tag 204 and NFC Reader 206 are communicatively coupled to one or more of the device specific resources 208.

Still referring to FIG. 2, near-field communication arrangement 200 further includes a computational platform 210. Computational platform 210 includes computational platform specific resources 211 and an NFC reader 212. It is noted that in various embodiments, NFC tag reader 212 may be a reader/writer. An NFC reader/writer is a functional block that, in addition to receiving data from an NFC tag, can also write data to the tag.

It will be appreciated that NFC-enabled devices in accordance with the present invention may be active or passive. Active devices have access to a power supply such as a battery or other DC power supply (e.g., an AC adaptor). Passive devices are those which need to harvest energy from an external field.

Figure 3:
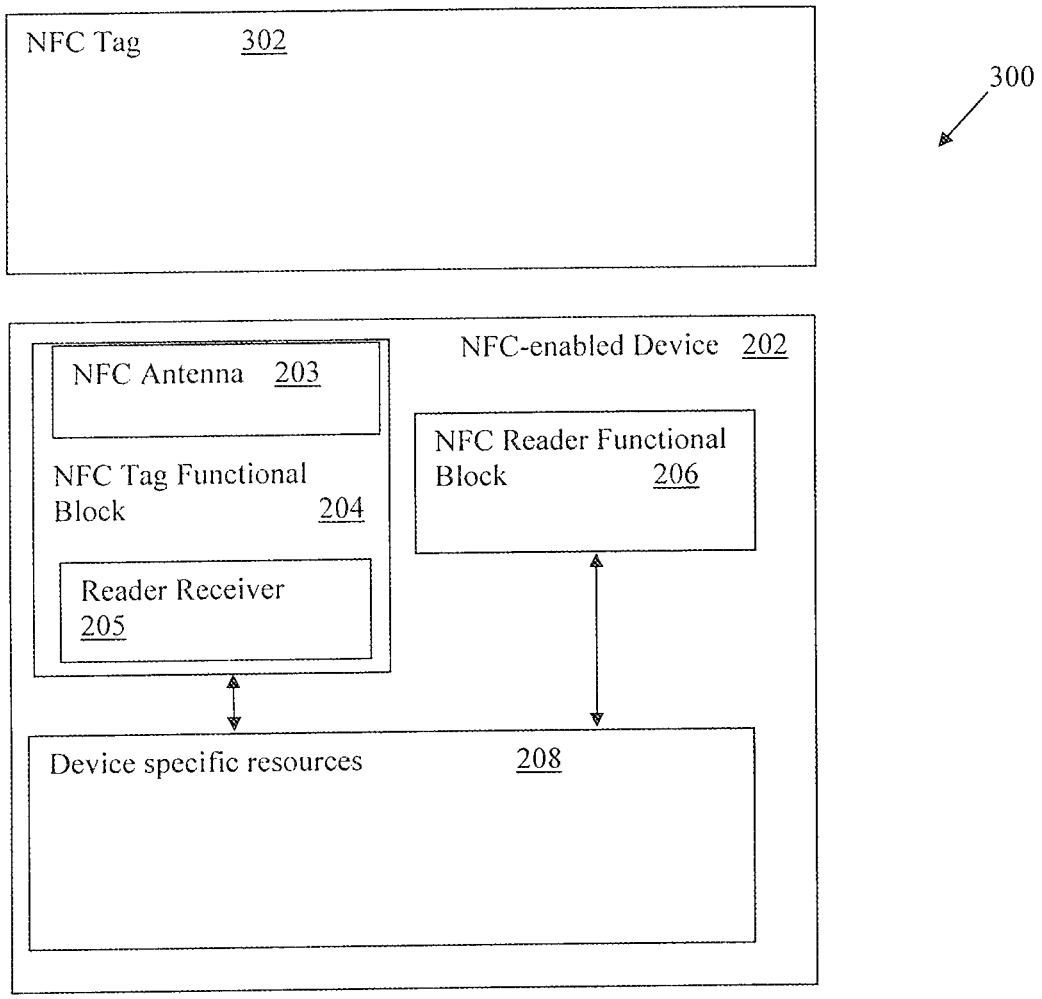
FIG. 3 is a high-level block diagram illustrating an NFC-enabled device having both tag and reader functionality, the NFC-enabled device disposed adjacent an NFC tag.

Referring to FIG. 3 an NFC communication arrangement 300 is shown. In this arrangement the NFC-enabled device 202 operates in reader emulation mode to read tag 302. In this scenario the present invention is used to provide an indication of how well NFC reader 208 is coupling to tag 302.

Figure 4:
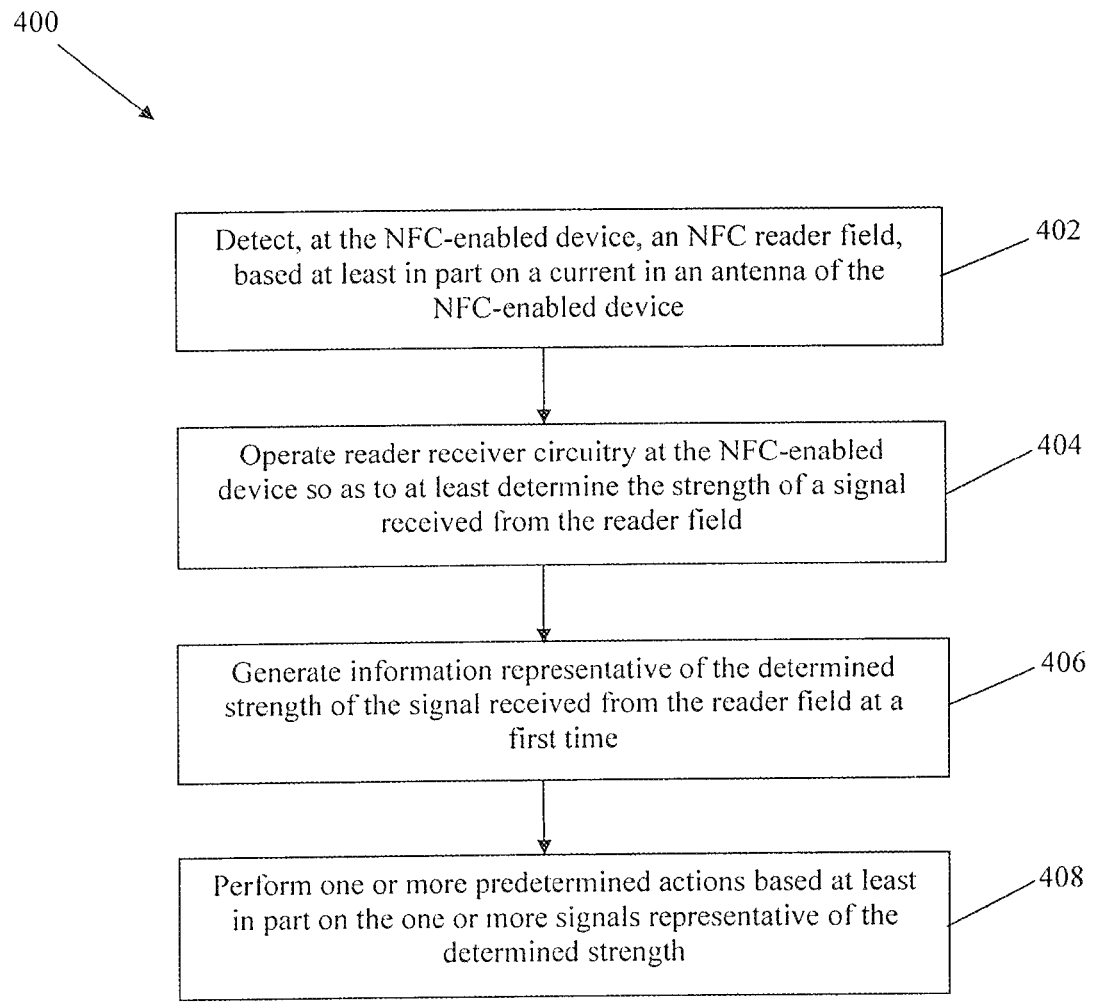
FIG. 4 is a flow diagram of a method of in accordance with the present invention.

FIG. 4 is a flow diagram of a method 400 in accordance with the present invention in which an NFC-enabled device may perform various actions based at least in part on the signal strength of a received signal. In this illustrative embodiment, when an NFC antenna of the NFC-enabled device comes within the near-field region of an NFC reader, the reader field induces a current in the NFC antenna. Illustrative method 400 includes detecting 402 the NFC reader field based, at least in part, on the current in the NFC antenna.

In this illustrative embodiment, a field detector circuit disposed within the NFC-enabled device is responsible for detecting the presence of the reader field and providing one or more signals to "wake" portions of the NFC-enabled device that are in a power-saving state or a powered-down state. These portions of the NFC-enabled device typically include the ones required to demodulate the incoming signal and process the information obtained therefrom. Method 400 continues by operating 404 reader receiver circuitry so as to at least determine the strength of the signal received from the reader field. It is noted that the reader receiver circuitry also demodulates the incoming signal. As part of that demodulation process, the reader receiver converts the measured antenna current to digital format and generates the I and Q versions of the signal. Since the levels of the I and Q signals are proportional to the current in the antenna, these signals are used as the basis for the signal strength meter function in accordance with the present invention.

It is noted that the field detector circuit can also give a measure of the received signal strength but this is generally a crude, or low resolution, measurement as compared to the accuracy afforded by using the I and Q signal levels. While a more accurate field detector circuit can be designed, this would require more circuitry, which is disadvantageous when compared to embodiments of the present invention that essentially "re-use" circuitry that already exists in the reader receiver.

Still referring to FIG. 4, illustrative method 400 continues by generating 406 information representative of the determined strength of the signal received from the reader field. This information may represent the received signal strength in any convenient format and the present invention is not limited by the manner or format in which the information is presented to other parts of the NFC-enabled device, to a user, or to other devices or computational platforms. Further, the information may be based on the signal strength at a particular time, or the information may contain data on the signal strength at a series of predetermined times, or the information may include one or more averaged or otherwise combined samples of the received signal strength.

Illustrative method 400 further includes performing 408 one or more predetermined actions based at least in part on the one or more signals representative of the determined strength. In some embodiments a visual indication of received signal strength is displayed on a touch screen display of an NFC-enabled device. Such an indication may be in the form of a bar graph, a dial, a text message, or any other suitable visual indication. In a further aspect, the NFC-enabled device may request input from a user with respect to whether to cancel or continue an NFC transaction based on the received signal strength.

In one illustrative embodiment, an NFC communicator, operating in tag emulation mode, is disposed within the near-field of an NFC tag reader. The present invention is not limited in regard to whether the NFC communicator, the NFC tag reader, or both are moved so that the communicator is within the near-field of the tag reader. A field detector of the communicator detects the presence of the reader's near-field and wakes up the rest of the communicator. Firmware within the communicator is executed by one or more computational resources disposed therein to exercise control over its further operations. A reader receiver circuit within the communicator performs well-known receiver functions including, but not limited to, converting from analog to digital, recovering I and Q signals, demodulating the signal from the tag reader and processing the information extracted from the tag reader's signal in accordance with the particular requirements of this communicator. The signal strength meter function of the present invention, based on the levels of the I and Q signals provides drive signals to a visual indicator of received signal strength. In this illustrative embodiment, the visual indicator is a series of LEDs activated to form a bar graph indicating the relative strength of the received signal. Based on such human perceivable output, a user may adjust the position or orientation of the communicator to achieve a stronger signal.

It is noted that visual output may take any suitable form. In various embodiments, the visual output of the signal strength meter may take the form of a dial, or numerical digits, or alphabetic characters, or colored lights, or even an electro-mechanical meter movement. In still other embodiments, the human perceivable output is an audio output, where the sound generated is indicative of signal strength. Alternatively, the I and Q signals provides drive signals to a acoustic indicator of received signal strength. In this illustrative embodiment, the acoustic represents a sound generating device indicating the relative strength of the received signal. For example, the sound generating device may generate a tone or vibrate indicating a low strength of the received signal. In still further embodiments, the information regarding received signal strength is transmitted via one or more communication resources of the communicator to another device. By way of example, and not limitation, the communicator may generate audio data based on the signal strength information and send that audio data to a Bluetooth earphone paired with the communicator.

Figure 5:
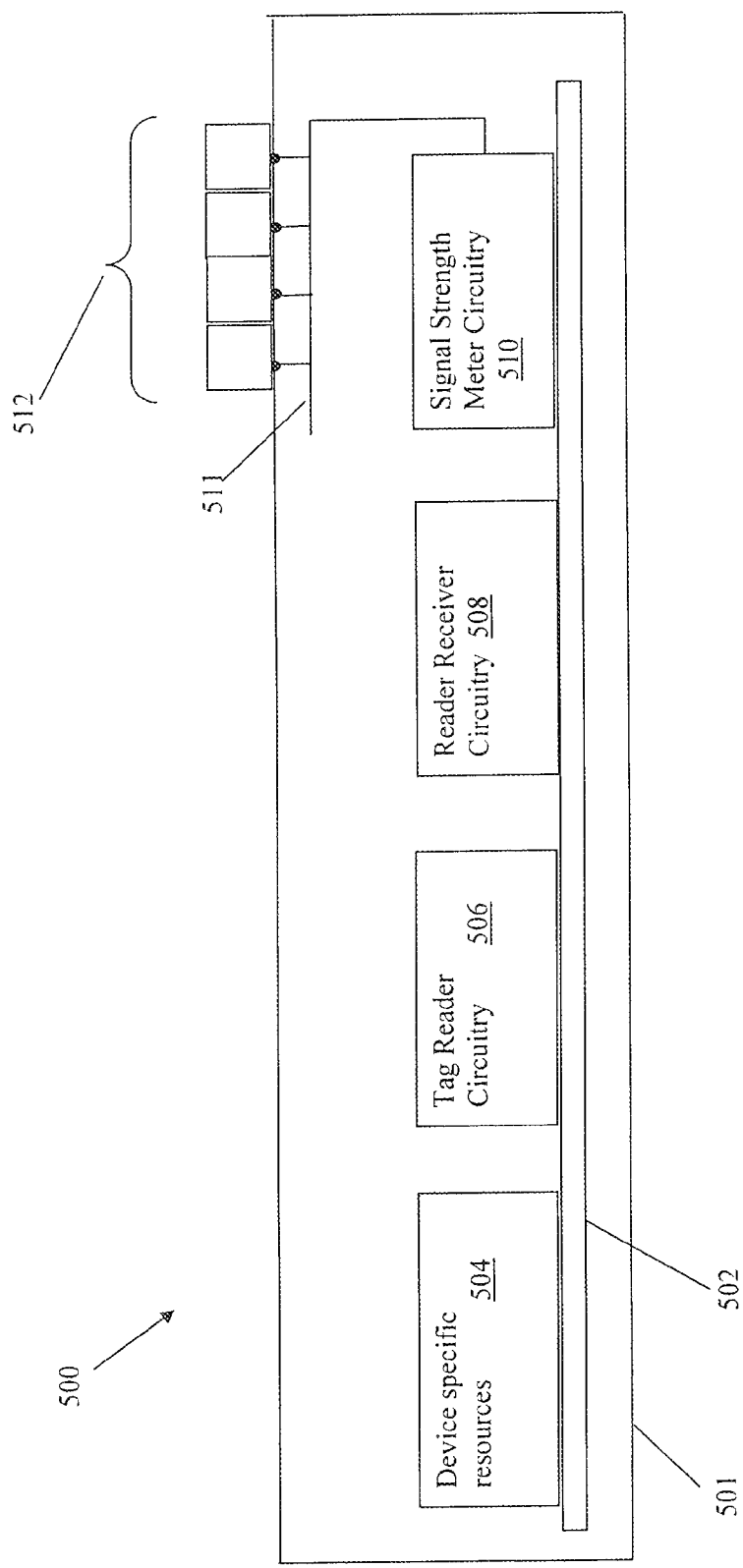
FIG. 5 is a block diagram of an NFC-enabled device having a visual indicator of signal strength.

FIG. 5 is a simplified block diagram of an illustrative NFC communicator 500 in accordance with the present invention. NFC communicator 500 includes a housing 501 within which is disposed a printed circuit board 502. In this illustrative embodiment, device specific resources 504, tag reader circuitry 506, reader receiver circuitry 508 and signal strength meter circuitry are all disposed on printed circuit board 502. Printed circuit board 502 provides not only a convenient substrate upon which to physically mount the various components, but also provides a plurality of conduction paths by which the various circuit blocks and components communicate with each other. It will be appreciated that such communicators may have multiple printed circuit boards each with multiple components thereon, and that some embodiments will have components on both sides of printed circuit board 502. Similarly, all the circuitry may be integrated onto a semiconductor substrate to form a single chip, or there may be a plurality of chips required to implement the communicator. The present invention is not limited to any particular physical layout, form factor, or arrangement.

In the illustrative embodiment of FIG. 5, signal strength meter circuitry 510 is coupled to a series a LEDs 512 by means of electrically conductive interconnect 511. In this way, signal strength meter circuitry 510 can provide the signals that illuminate one or more of LEDs 512 so as to indicate the strength of the signal received from the reader field.

Signal Strength Versus Error Rate

As noted above, many applications of near-field communication involve transactions where the tolerance for unreliable data transfer is low. Such applications include, but are not limited to, banking transactions, retail payments, and operating a contactless gate or similar means of accessing public transportation.

In a contactless, proximity-based, communication arrangement such as near-field communication, a small change in the distance between a tag and a tag reader, or in the orientation of their antennas can act to reduce signal strength and in turn the reliability of the communication.

Various embodiments of the present invention alert a user to the occurrence of low signal strength coupling between an NFC tag and an NFC reader. With the information, the user can intelligently choose to cancel or redo a transaction.

Signal Strength-Stamping

In some embodiments, information received by an NFC-enabled device is "stamped" with one or more signal strength measurements taken in the course of receiving the information. That is, one or more signal strength measurements may be provided to one or more consumers of the received information, in one or more formats. The function of providing this metadata is referred to herein as signal strength-stamping.

It is noted that in some embodiments, the signal strength measurements are incorporated with the received information, whereas in other embodiments the signal strength measurements are separated from the received information. Signal strength-stamping may be combined with time-stamping and/or location-stamping.

By stamping received data with one or more signal strength measurements, the NFC-enabled device in accordance with the present invention provides a record that can be used for diagnostic purposes, or to show whether received data was extracted from a signal with sufficient strength to ensure reliable data transfer between the near-field coupled NFC devices.

Averaged DC Current in Tag Emulator Antenna

In an alternative embodiment, when operating in tag emulation mode, the signal strength from the reader can be determined by measuring the averaged DC current induced in the tag emulator antenna from the reader when the tag shunt regulator is operating. Up to the point where the tag regulator starts to operate, the peak to peak voltage across the coil terminals can be used to represent the field strength. In other words, a method in accordance with the present invention creates a measurement of range by using the peak voltage across the tag emulator antenna when this voltage is below the shunt regulator threshold, and uses a measure of the current in the antenna when the tag shunt regulator is shunting. Measuring the current in this way essentially allows the shunt regulator's feedback signal to be "reused". Such an alternative embodiment advantageously provides a low-cost tag emulation only NFC device (which may still be part of a larger host).

Figure 6:
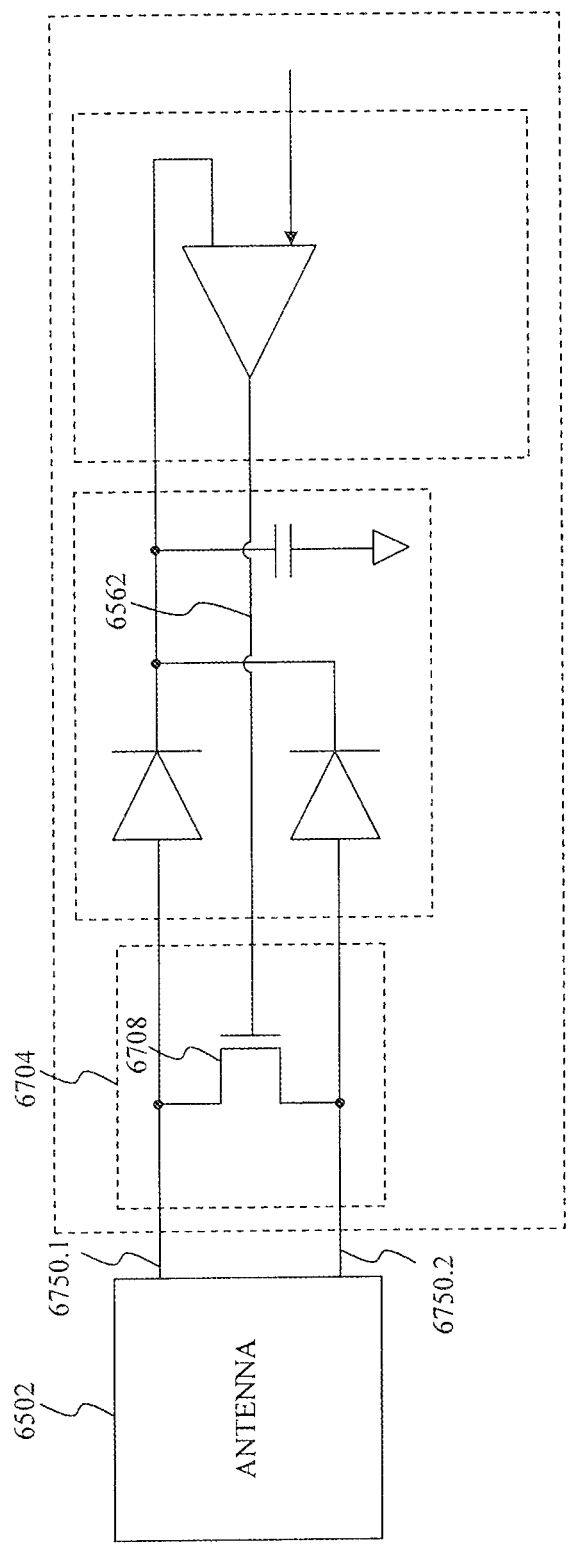
FIG. 6 is a schematic diagram of a tag emulator antenna shunt regulator circuit.

A simplified schematic diagram of an exemplary tag shunt regulator circuit is shown FIG. 6. A tag emulator antennal 6502 provides differential signal pair 6750.1 and 6750.2, A regulator module 6704 adjusts the power level of the differential recovered communications signal 6750.1, 6750.2 in response to the regulation control signal 6562. The regulator module 6704 includes a shunt transistor 6708. The shunt transistor 6708 represents a controllable impedance that shunts at least some of the recovered communications signal 6750.1 with at least some of the differential recovered communications signal 6750.2 when the regulation control signal 6562 is greater than or equal to its threshold voltage. The amount of the differential recovered communications signal 6750.1, 6750.2 that is shunted together is related to a magnitude of the regulation control signal 6562. The shunt transistor 6708 will shunt more of the differential recovered communications signal 6750.1, 6750.2 together for a larger regulation control signal 6562.

In one embodiment of the present invention, a method of operating an NFC-enabled device, includes detecting, at the NFC-enabled device, an NFC reader field, based at least in part on a current in an antenna of the NFC-enabled device; operating reader receiver circuitry at the NFC-enabled device so as to at least determine the strength of a signal received from the reader field; generating information representative of the determined strength of the signal received from the reader field at a first time; and performing one or more predetermined actions based at least in part on the one or more signals representative of the determined strength.

In some embodiments, performing one or more predetermined actions includes generating a user perceivable output representative of the determined signal strength. A user perceivable output may include one or more of a wide variety of visual indicators such as, but not limited to images, icons, patterns, dials, bar graphs, lights, LEDs, and so on. Outputs may further include audio indicators produced by an NFC-enabled device with signal strength meter functionality in accordance with the present invention. Various embodiments may direct remote devices to produce signal strength indicators (e.g., Bluetooth earphone paired with the NFC-enabled device, or similar arrangements).

Some embodiments include waking at least a portion of the NFC-enabled device from a power-saving or a power-down state, subsequent to detecting the reader field.

Still other embodiments include determining that the received signal strength is below a threshold value and generating a user perceivable output indicative of the received strength being below the threshold value.

Still further embodiments include generating information representative of the determined strength of the signal received from the reader field at each of one or more times subsequent to the first time; and storing the information associated at least one of the one or more times subsequent to the first time.

CONCLUSION

It is to be appreciated that the Detailed Description section, and not the Abstract of the Disclosure, is intended to be used to interpret the claims. The Abstract of the Disclosure may set forth one or more, but not all, exemplary embodiments of the invention, and thus, is not intended to limit the invention and the subjoined claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the subjoined claims and their equivalents.

What is claimed is:

1. An NFC-enabled mobile device, comprising:
    a field detector circuit configured to detect an NFC reader field based on a current induced within an antenna of the NFC-enabled mobile device;
    a receiver circuit configured to wake from a powered-down state in response to detection of the NFC reader field by the field detector circuit, the receiver circuit further configured to generate in-phase (I) and quadrature (Q) components of an incoming signal received from the NFC reader field;
    first circuitry configured to determine a strength of the incoming signal received from the NFC reader field based on the I and Q components generated;

second circuitry configured to generate information representative of the determined strength at a first time; and
third circuitry configured to generate a first user perceivable output representative of the determined strength of the incoming signal, the first user perceivable output configured to direct a user to improve the strength of the incoming signal.

2. The NFC-enabled mobile device of claim 1, wherein the first user perceivable output comprises a visual display.

3. The NFC-enabled mobile device of claim 2, wherein the visual display is configured to display a bar graph.

4. The NFC-enabled mobile device of claim 2, further comprising a housing inside of which the field detector circuit and the reader receiver circuit are disposed.

5. The NFC-enabled mobile device of claim 4, wherein the third circuitry is mounted within the housing such that the visual display is observable from outside of the housing.

6. The NFC-enabled mobile device of claim 4, wherein the third circuitry is mounted on the housing such that the visual display is observable from outside of the housing.

7. The NFC-enabled mobile device of claim 4, wherein the first circuitry and the second circuitry are disposed within the housing.

8. The NFC-enabled mobile device of claim 2, wherein the visual display comprises LEDs.

9. The NFC-enabled mobile device of claim 1, further comprising a printed circuit board disposed within the housing.

10. An NFC-enabled computational platform, comprising:
a first circuit configured to detect a current induced by an NFC reader field in an NFC antenna of the NFC-enabled computational platform, wherein the current represents a measure of coupling between the NFC reader field and a tag;
a reader receiver configured to a measure of the current in the NFC antenna and to receive in-phase (I) and quadrature (Q) versions of a signal in the NFC antenna;
a second circuit configured to generate a signal indicative of the coupling between the NFC reader field and the tag based on levels of the I and Q components of the signal; and
a third circuit configured to produce a user perceivable output based on the signal.

11. The NFC-enabled computational platform of claim 10, wherein the third circuit is coupled to a visual display.

12. The NFC-enabled computational platform of claim 11, wherein the visual display is configured to display a bar graph.

13. The NFC-enabled computational platform of claim 10, wherein the user perceivable output is an audio output.

14. The NFC-enabled computational platform of claim 10, further comprising:
a fourth circuit configured to wirelessly transmit a command to a device that is physically remote from the NFC-enabled computational platform;
wherein the physically remote device is configured to produce a user perceivable output.

15. The NFC-enabled computational platform of claim 14, wherein the physically remote device comprises an earphone.

16. The NFC-enabled computational platform of claim 10, further comprising a housing inside of which the first circuit and the reader receiver circuit are disposed.

17. The NFC-enabled computational platform of claim 16, wherein the third circuit is mounted within the housing such that the visual display is observable from outside of the housing.

18. The NFC-enabled computational platform of claim 16, wherein the third circuit is mounted on the housing such that the visual display is observable from outside of the housing.

19. An NFC-enabled mobile device, comprising:
a field detector circuit configured to detect an NFC reader field based on a current induced within an antenna of the NFC-enabled mobile device;
a receiver circuit configured to wake from a powered-down state in response to detection of the NFC reader field by the field detector, the receiver circuit further configured to generate in-phase (I) and quadrature (Q) components of an incoming signal received from the NFC reader field;
first circuitry configured to determine a strength of the incoming signal received from the NFC reader field based on the I and Q components generated;
second circuitry configured to generate information representative of the determined strength at a first time; and
third circuitry configured to generate a first user perceivable output representative of the determined signal strength, the first user perceivable output configured to direct a user to improve the strength of the signal received;
wherein the field detector includes a shunt regulator.

* * * * *